United States Patent [19]
Delisle et al.

[11] 3,805,158
[45] Apr. 16, 1974

[54] DEMAND METER WITH LIMIT INDICATOR

[75] Inventors: Jules Delisle; Pierre A. Deschenes; Adrien Leroux, all of Sherbrooke, Quebec, Canada

[73] Assignee: Consulab Inc., Beauport, Quebec, Canada

[22] Filed: Sept. 26, 1972

[21] Appl. No.: 292,277

Related U.S. Application Data

[62] Division of Ser. No. 140,671, May 6, 1971, Pat. No. 3,714,453.

[52] U.S. Cl. ............................................. 324/157
[51] Int. Cl. ................................................ G01n 1/00
[58] Field of Search ..................................... 324/157

[56] References Cited
UNITED STATES PATENTS
2,536,806   1/1951   Hansen ........................ 324/157 X
FOREIGN PATENTS OR APPLICATIONS
382,455   11/1964   Switzerland ....................... 324/157

*Primary Examiner*—Alfred E. Smith
*Attorney, Agent, or Firm*—Cushman, Darby & Cushman

[57] ABSTRACT

The disclosure herein describes an improved load regulating system for selectively adding or dropping load circuits in a local electrical distribution system based on the power measured by the utility company and using a demand meter similar to the one installed by the utility company but modified to detect information concerning the power consumed by the plant within preselected limits; the system further includes a decision circuit which is fed with the information received from the detecting apparatus and which feeds this information combined with synchronization pulses received from a clock mechanism to a selecting-cycling unit which, in turn, triggers actuators associated with the load circuits.

3 Claims, 9 Drawing Figures

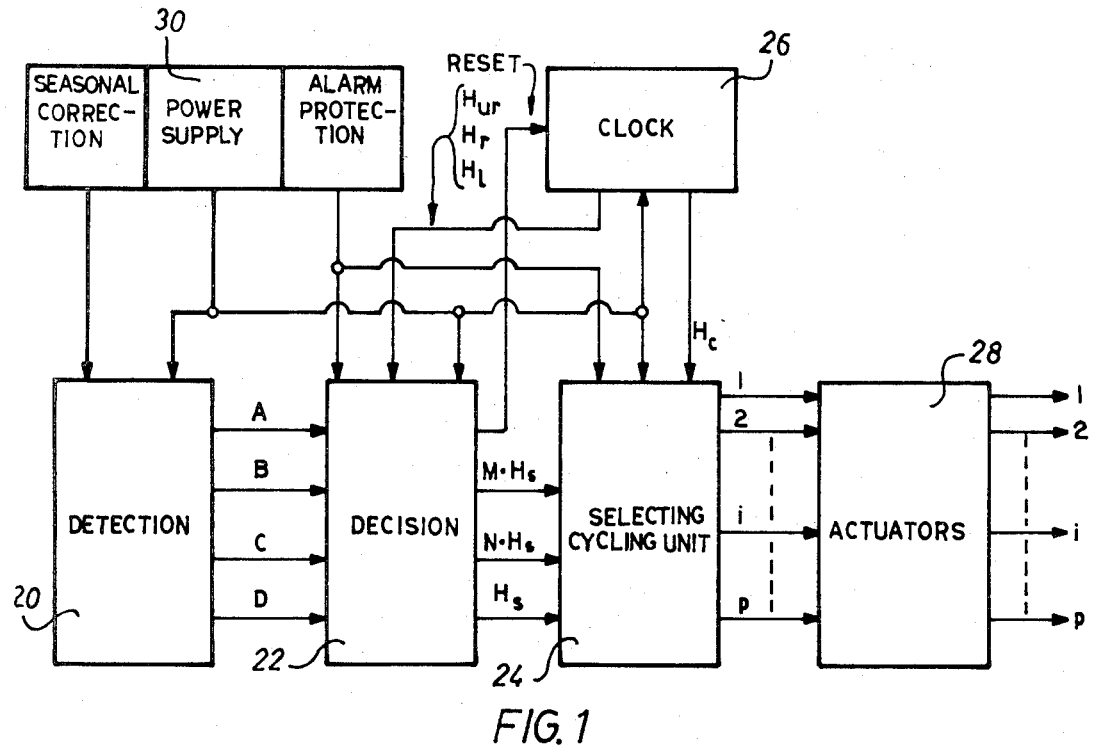
FIG. 1
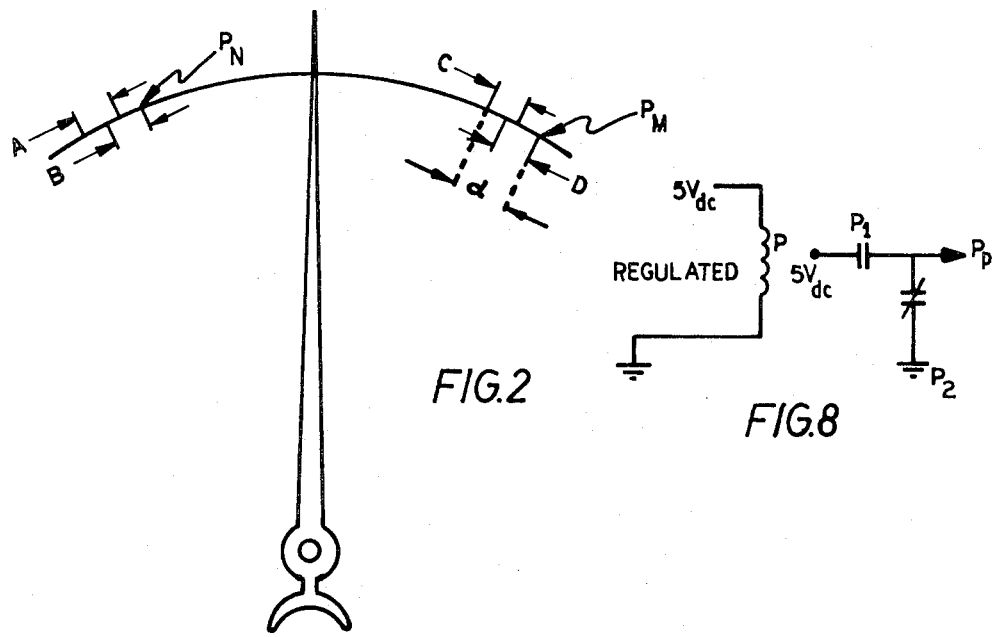
FIG. 2
FIG. 8

STABILITY

DEMAND METER WITH LIMIT INDICATOR

The present invention relates generally to a load regulating system, and more particularly to a load regulating system for selectively adding or dropping electric load circuits in a local electrical distribution system.

In the field of electrical energy utilization, the customer is often charged by the electric utility company according to the maximum demand for electrical energy over a billing period and a maximum demand meter is installed on the customer's premises for recording the maximum electric energy which was consumed during that time interval.

Throughout each day, peak load periods vary; some of the loads causing these peaks are known to the customer while others cannot be predicted. However, despite the large variation of the demand, it is advantageous to the user to maintain the peak load below a predetermined limit. Such a condition, for the customer, has a billing advantage in avoiding overruns and also underusage of th power purchased while, for the supplier, it enables him to provide a more adequate service to all his customers.

Some system have been devised for monitoring and limiting the power demand in a local electrical distribution system; in most cases, this has been achieved by requlating the load based on the actual power consumed. However, it would be advantageous to the customer if the power demand could be regulated according to the characteristics of the billing meter in order to take advantage of the time interval between the actual power consumed by the plant and its actual recording on the wattmeter or kvameter of the electric utility company. It is an important feature of the present invention to take advantage of this time interval in order to regulate the maximum possible load to which it is wished to limit the energy consumption; this also allows a reduction in the number of times that loads have to be dropped or reconnected.

It is an object of this invention to provide a load regulating system which monitors and controls power demand within maximum and minimum load values preselected by the customer.

It is an object of the present invention to provide an improved load regulating system for selectively adding or dropping load circuits in response to the occurrence of those loads which are known to give power peaks as well as those loads which cannot be predicted.

It is a further object of the present invention to provide a load regulating system which tends to foresee the occurrence of a load that will exceed the desired maximum permissible load.

It is also an object of the present invention to automatically adjust the maximum and minimum load values according to the seasons of the year and to the power predicted for each season. The electrical installation includes certain loads which can never be dropped; they are called non-regulated loads. Those loads which can be dropped are called regulated loads.

Broadly, the present invention provides a load regulating system which comprises a detecting device which measures the load consumed by the local system which follows the time characteristics of the actual metering apparatus; this device sends a signal to a decision circuit which determines, in order to limit the total measured load within the preselected limits, whether load circuits are to be dropped from or reconnected to the network. The detecting device consists of a demand meter similar to the one installed by the electric utility company; however, it is modified so that three regions defined by the preselected limits can be identified: the first region is disposed below the lower limit where load circuits are reconnected one by one as long as there are unconnected regulated loads; the second region is disposed adjacent the upper limit where one or more load circuits are to be dropped; and a third region is disposed between the upper and lower limits where no action is taken.

The decision circuit further determines the position and direction of the needle of the modified demand meter and then decides on the speed at which loads will be dropped or reconnected, if this is so required.

The regulating system also comprises a selecting-cycling unit which is fed with information received from the decision circuit. The regulated loads may be dropped according to two modes. In one mode, they are dropped or reconnected and cycled according to a predetermined and fixed order; in the other mode, they are cycled only. The unit includes a selector, which operates according to signals received from the decision circuit to drop or reconnect regulated loads, and a cycler which causes the rotation of the cycled loads at fixed intervals.

The system further consists of a clock which sends two types of synchronization pulses; one type of pulses triggers the dropping or the reconnecting action and the other type of pulses commands the rotation of the loads. Finally, the load regulating system consists of actuators which serve to adapt the selector and cycler signals to load relays associated with the load circuits.

Other objects of the invention will be apparent from the following description taken in conjunction with the accompanying drawings in which:

FIG. 1 is a block diagram of the load regulating system;

FIG. 2 is a schematic view of the demand meter needle between preselected upper and lower limits;

FIG. 8 is a diagrammatic representation of the components of the protection circuit and is shown on the sheet showing FIGS. 1 and 2.

Figure 3:
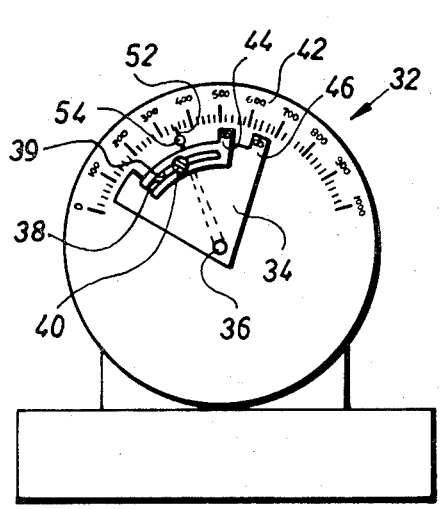
FIG. 3 is a front elevational view of a modified demand meter.
Figure 3A:
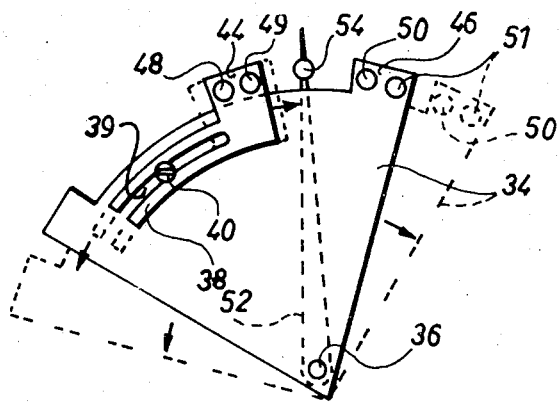
FIG. 3a is an enlarged view of the plate and needle shown in FIG. 3.

In the preferred embodiment of the invention illustrated in FIG. 1, the system is shown in block diagram form to facilitate an understanding of the invention.

The load regulating system of the present invention consists broadly of a detection circuit 20 feeding information, such as signals A, B, C, D, to a decision circuit 22, of a selecting-cycling unit 24 which operates in response to the decision of circuit 22 and to a synchronization pulse $H_C$ received from pulse producing means 26, such as a clock, and of actuators 28 which adapt the signals received from the selecting-cycling unit 24 to relays which serve to connect the load circuits.

DETECTION CIRCUIT

The detection circuit 20 is connected to the utility feeder (not shown) and fed by a power supply 30; it must be able to recognize and provide information concerning two values of the power used by the cutsomer: a first load value, hereinafter referred to as $P_M$, to which it is desired to limit at all times the power measured by the electrical distribution system; a second load value, hereinafter referred to as $P_N$, under which loads may be added or reconnected to the network. These two values of $P_M$ and $P_N$ are respectively upper and lower limits preselected by the customer. These two limit define three regions. In a first region where the actual power measured is equal or below lower limit $P_N$, there is no constraint on the system and loads may be added freely: previously dropped load circuits may be reconnected. In a second region where the load consumption is between the value of lower limit $P_N$ and the value $P_{Mid}$ (where d represents a precautionary distance before $P_M$ is reached), no loads are dropped and no loads are reconnected. In a third region where the measured load exceeds the limit $P_{M-d}$ some loads must be dropped. In order that decisions concerning the dropping and reconnecting of loads may be undertaken without ambiguity, the detecting circuit is devised to give four indications concerning the power measured in relation to the lower and upper limits. The first two indications are noted A and B, and the other two are noted C and D. the values A, B, C, D are logic signals of value 0 or 1, value 1 indicating that the actual load measured is within the boundaries of the values A, B, C or D as shown in FIG. 2.

Figure 4:
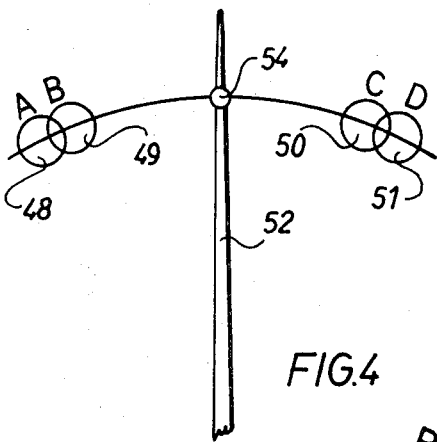
FIG. 4 is a schematic view illustrating the relationship of the radiant energy emitting needle and four radiant energy detecting devices.

Referring to FIGS. 3 and 4, the detection circuit 20 consists principally of a detector 32 which is a modified wattmeter or kvameter, such as the Sangamo meter described in Canadian Pat. No. 757,744 issued Apr. 25, 1967. For simplification, only the pointer or needle 52 and the graduated face 42 of the meter have been shown. The modification consists in mounting on the wattmeter or kvameter a plate 34 which is rotatable about pivot 36. A second plate 38 is adjustably secured on plate 34 by appropriate means, such as bolt 40 extending through a slot 39. As an alternative, plate 38 could also be mounted for pivotal movement about pin 36 with plate 34 while still being adjustable to plate 34. Plates 34 and 38 are each provided with respective portions 46 and 44 which carry radiant-energy detecting units, each consisting of a pair of laterally disposed radiant-energy sensitive devices such as light-receiving diodes 48 and 49, 50 and 51. The modification of the Sangamo demand meter further includes the addition on the needle 52 of a radiant energy emitting device such as light-emitting diodes 54 disposed on the tip of the needle. Suitable circuitry (not shown) is provided for the radiant-energy emitting device 54 and the radiant-energy detecting devices 48–51; as an example, the circuitry of the radiant-energy detecting devices may consist of integrated circuits which could be mounted on plate 34. The emitting device must be small, such as a solid state emitting diode, and is glued to the needle with epoxy or the like; energy is brought to the device at about two volts with very small magnet wires. These wires are positioned in such a way as not to produce a retaining torque in the meter mechanism. Referring to FIG. 4, the correspondence of the values of A, B, C and D and the radiant-energy receiving areas of the radiant-energy sensitive device 48, 49, 50 and 51 are shown. The detecting devices 48 and 49 are contiguous so that for a certain position of the radiant-energy emitting device both areas A and B are sensitized. For the same reason, the detecting devices 50 and 51 must be close by.

In operation, plate 34 is pivoted about pivot 36 so that the radiant-energy detecting devices 50 and 51 are set at the desired limit of $P_M$ on the graduated face of the meter. Then, plate 38 is adjusted relative to plate 34 so that the radiant-energy detecting devices 48 and 49 be set at the desired limit of $P_N$ on the graduated face of the meter. As mentioned above, the preselected values of $P_M$ and $P_N$ indicate the upper and lower limits which will determine whether loads are to be dropped or reconnected to the circuit. When needle 52, which is indicative of the power being measured to the plant, passes by units 44 or 46, radiant-energy emitted by the emitter 54 will energize any of the radiant energy detecting devices 48, or 48 and 49, or 49, or 50, or 50 and 51, or 51 which will emit a corresponding signal A, B, C or D, each being a logic signal 1 transmitted to the decision circuit 22.

CLOCK

Clock 26 provides two types of synchronization pulses of different frequencies but dependent on the actual power measured by the detector: a first type of pulses noted $H_{UR}$ (UR for ultra rapid); $H_R$ (R for rapid); $H_L$ (L for low) and a second type of pulse $H_C$. As an example, the period of $H_{UR}$ would be eight times longer than the one received at the output of the basic clock; the period of $H_R$ would be four times longer than the period of $H_{UR}$, and the period of $H_L$ would be twice the period of $H_R$. The frequency $H_C$ equals that of $H_L$ but is slightly out of phase so as to avoid the simultaneous presence of $H_C$ and $H_S$ where $H_S = H_{UR} + H_R + H_L$ (the + sign representing a logic sum).

Figure 5:
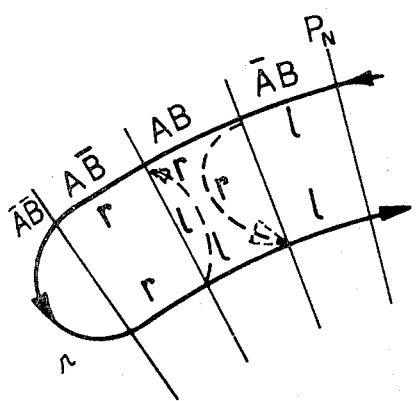
FIG. 5 is a schematic view of the clock speed relative to the direction of the demand meter needle and to the regions detected.
Figure 5:
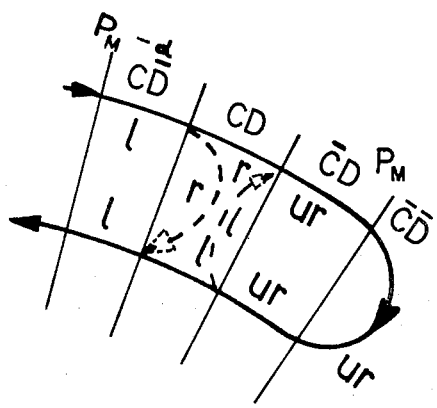

Referring to FIG. 5, the speed of clock 26 is dependent on the position and the direction of the radiant-energy emitting needle 52 of the meter. Therefore, in the region where B alone (conventionally designated as $\overline{A}B$) is energized and in the region where C alone ($C\overline{D}$) is energized, the speed of the clock is always low. In the region AB (where both A and B are energized), the speed is rapid if this region is reached from $\overline{A}B$ and remains rapid even if the load increases where needle 52 changes direction inside region AB; it is only when zone $\overline{A}\overline{B}$ is reached that the speed will change to $H_L$ or low. Furthermore, in the region AB, the speed is low if this region is reached from $A\overline{B}$ and remains low even if the load decreased where needle 52 changes direction inside region AB; it is only when region $A\overline{B}$ is reached that the speed of the clock will change to rapid. The speeds of the clock in the other zones may be similarly explained; it is to be noted, however, that in the zone nearest to $P_M$, the speed of the clock is ultra-rapid.

DECISION CIRCUIT

Figure 6:
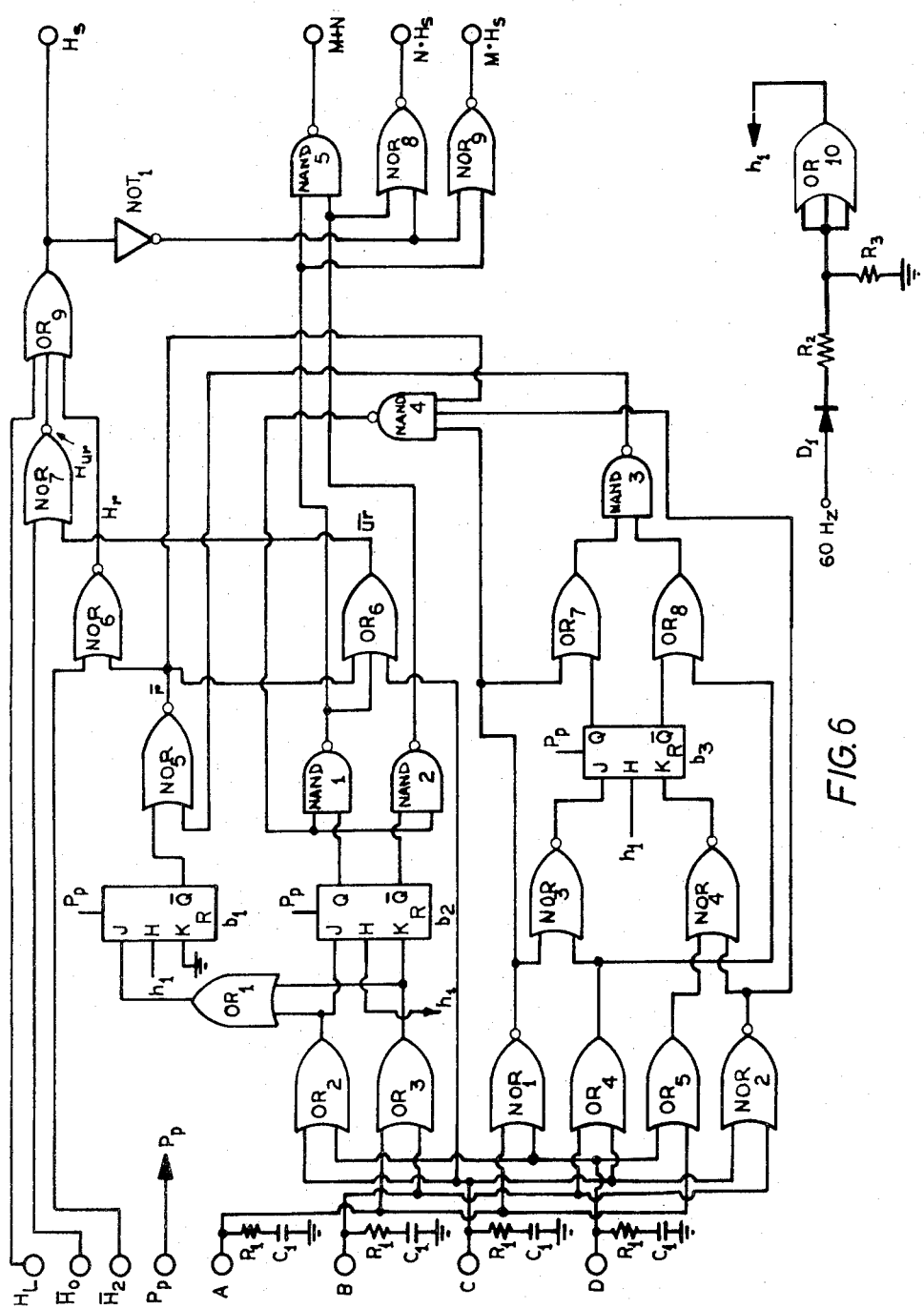
FIG. 6 is a diagrammatic representation of the components of the decision circuit.

The decision circuit must determine when it is necessary to drop one or more load circuits, to add one or more circuits or to do nothing, i.e., to maintain the system with the load circuits presently in use. The decision circuit also must determine with what speed these actions must be taken. The decision circuit functions in response to the signals A, B, C, D received from the detection circuit and with the synchronization pulses received from the clock; this decision circuit provides the command values $H_S$, $M \cdot H_S$, $N \cdot H_S$, (the dot sign representing a logic product) which are fed to the selecting-cycling unit and the values of M and N which resets the clock. The values M and N are switching variables: when the output M of the decision circuit equals value 1, this indicates that it is possible for the selecting-cycling unit to reconnect loads. On the other hand, when at the output of the decision circuit N equals 1, this indicates that loads must be dropped as long as N keeps this value. It is evident that it will be impossible for M and N at the output of the decision circuit to simultaneously take the value 1. Therefore, for:

MN = 00: no action is taken;
MN = 10: reconnection of dropped loads;
MN = 01: dropping of loads Values M and N associated with $H_S$ (representing the selecting frequency) trigger the changes which are commanded by the decision circuit. Furthermore, the decision circuit enables the choosing between the signals $H_{UR}$, $H_R$ and $H_L$, the one which is best suited for the position of the detector needle. The speed of $H_S$ is changed in accordance with the position of the needle in order to obtain a stable operation while preventing it from exceeding $P_M$. In FIG. 6, the following conventions have been adopted:

A, B, C or D = 1: the radiant-energy sensitive device detects energy.
A, B, C or D = 0: the radiant-energy sensitive device does not detect energy.
M = 1: loads are reconnected
M = 0: the needle is above $P_N$
N = 1: loads must be dropped
N = 0: the needle below C
$H_L$ = 1: low speed is permitted but not necessarily used
$H_R$ = 1: rapid speed is permitted but not necessarily used
$H_{UR}$ = 1: ultra rapid speed is permitted and used An example of a decision circuit for use with the present invention is illustrated in the diagram of FIG. 6. The circuit is fed at the input with variables A, B, C, D, $\bar{H}_0$ ($H_{UR}$), $\bar{H}_2$ ($H_r$), $H_L$ and gives at the output ($M \cdot H_S$), ($N \cdot H_S$), M or N, and $H_S$. At the initial state, when power is applied or after a power failure (as hereinbelow explained), the flip-flop circuits $b_1$, $b_2$ and $b_3$ take the state 0, whick then commands the state 1, 1, 0 respectively for $H_L$, $H_R$ and $H_{UR}$. This initial state remains as long as A, B, C, D are at 0; if one or more of these variables is or take the value 1, the circuit operates in a normal way. The interaction of the state of $b_1$, $b_2$, $b_3$ with $\bar{H}_0$, $\bar{H}_2$ and $H_L$ provides the appropriate output of the decision circuit.

SELECTING-CYCLING UNIT

The selecting-cycling unit 24 consists of a selector which operates under the command of the outputs $M \cdot H_S$, $N \cdot H_S$ and $H_S$ of the decision circuit 22 and also under the command $H_C$ issued by the clock 26. In response to each pulse $H_S$ received from the clock appearing at intervals of a given period, a load is dropped if the variable N has a value 1 or is reconnected if M has a value 1. Load circuits are dropped until variable N takes value 0 and load circuits are continuously reconnected until variable M takes value 0. The selecting-cycling unit also consists of a cycler, the function of which is to effect the rotation of the load circuits at fixed intervals of periods in response to signal $H_C$ received from the clock 26.

The function of the cycler is defined as it is presently being realized in commercially available control systems. The only input which has a bearing in the performance of the cycler is pulse $H_C$ of the clock. For each pulse $H_C$ the state of a flip-flop is transferred to the one preceding and the state of the first flip-flop is transferred back to the last.

Figure 7:
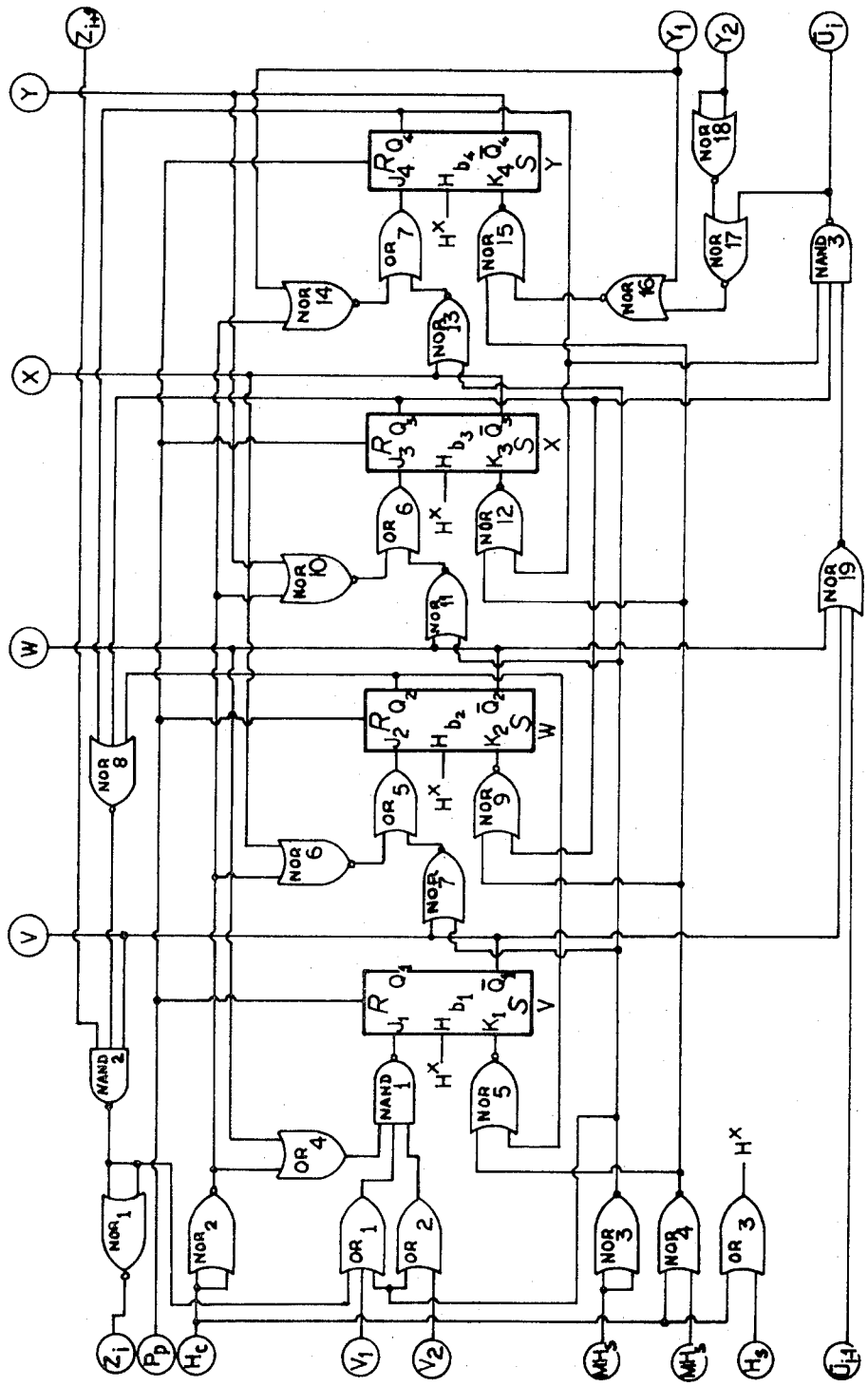
FIG. 7 is a diagrammatic representation of the components of the selecting-cycling unit circuit.

Referring to FIG. 7, an example of a circuit for the selecting-cycling unit is given; the unit is made up of modules carrying four loads, each called V, W, X and Y. Flip-flop circuits $b_1$, $b_2$, $b_3$, $b_4$ receive a triggering pulse $P_P$ which, in case of power failure, returns them to the 0 state. Then, $$\bar{Q}_V = \bar{Q}_W = \bar{Q}_X = \bar{Q}_Y = 1$$

and all the loads are dropped. This convention has been adopted on the assumption that the outputs are connected to relays operating with contacts normally closed.

Besides values $H_C$, $MH_S$, $NH_S$ and $H_S$, it is also necessary to known the state of the positions of the preceding and following modules; these states are called $U_{i-1}$ and $Z_{i+1}$. In FIG. 7, for selecting, J is acted upon for connecting loads whereas K is acted upon for dropping loads; the state of the preceding flip-flop circuit determines the state to be taken for connecting loads whereas the next flip-flop circuit determines the state to be taken for dropping loads. Secondly, for cycling, it is always the flip-flop circuit that follows which determines the state to be taken.

Concerning flip-flop circuits V and Y, one must consider the position of the module in the overall system and of its definition, i.e., selector or cycler. In order to avoid to modify the circuit whether used as a selector or used as a cycler, four variables $V_1$, $V_2$, $Y_1$, $Y_2$ are introduced and are connecting points which must take the values indicated in Table 1. It is to be noted that J of flip-flop V depends from what follows while K of flip-flop Y depends from what precedes.

1. VALUES FOR J OF V

| | 1 | 2 | 3 | 4 | Remarks | $V_1$ | $V_2$ |
|---|---|---|---|---|---|---|---|
| a) | V | S | | | V is at the 1st position of the first module of the system, a selector module. | 0 | 1 |
| b) | V | C | | | V is at the 1st position of the first module of the system, a cycler module. | 0 | $P_0$ |
| c) | S | V | S | | V is part of selector module m preceded by a selector module. | 1 | $Y_{m-1}$ |
| d) | C | V | C | | V is part of a cycler module m preceded by a cycler module. | 1 | $Y_{m-1}$ |
| e) | S | V | C | | V is part of a cycler module m preceded by a selector module. | $Y_{m-1}$ | $P_0$ |
| f) | C | V | S | | V is part of a selector module m preceded by a cycler module. | 1 | $U_{m-1}$ |

2. VALUES FOR K OF Y

|   | 1 | 2 | 3 | 4 | Remarks | $V_1$ | $V_2$ |
|---|---|---|---|---|---------|-------|-------|
| a) | S | Y |   |   | Y is the last position of the last module of the system, a selector module. | 0 | 1 |
| b) | C | Y |   |   | Y is the last position of the last module of the system, a cycler module. | $P_i$ | 1 |
| c) | S | Y | S |   | Y is part of a selector module m followed by a selector module. | $V_{m+1}$ | 0 |
| d) | C | Y | C |   | Y is part of a cycler module m followed by a cycler module. | $V_{m+1}$ | 0 |
| e) | C | Y | S |   | Y is part of a cycler module m followed by a selector module. | $P_i$ | $V_{m+1}$ |
| f) | S | Y | C |   | Y is part of a selector module m followed by a cycler module. | $Z_{m+1}$ | 0 |

TABLE 1

Table 1 shows all the possibilities and the corresponding values tha $V_1$, $V_2$, $Y_1$, $Y_2$ must take: $V_1$ and $V_2$ are dependent on what precedes the actual module and on its function (selecting or cycling-selecting) of this module; $Y_1$ and $Y_2$ are dependent on what follows the actual module considered and on its function. In this table, the four circuits are named 1 to 4 and correspond to flip-flops V, W, X and Y respectively; symbols S or C refer to the associated module being used in a selecting mode or a cycling and selecing mode.

0 and 1 correspond to the voltage of the logical values 0 and 1, $(m-1)$ to the module preceding the actual module, $(m+1)$ to the module following the actual module. $\bar{P}_0$ is the output $\bar{Q}$ of flip-flop Y of the last module of the cycler and is the first positions be cycled since the cycling is being done in a direction opposite to the one used for the selecting $P_i$ is the output Q of the flip-flop V of the first module of the cycler and is the last position to be cycled. Let us recall that $U_{m-1}$ is an indication of the state of all the elements preceding the actual module, $Z_{m+1}$ an indication of the state of all the elements following the actual module.

ACTUATORS

As explained above, the function of the actuators is to adapt the signals received from the selecting-cycling unit to power relays associated with the load circuits. An amplifier will therefore be required to operate the relay corresponding to each position ($p$ positions, $p$ relays). It is to be reminded that each relay only requires a normally closed contact.

POWER SUPPLY

The components used in the present load regulating system require direct current; the electronic components need $5V_{DC}$ and $0V_{DC}$ while the electromechanical components need $6V_{DC}$; however, in the latter case, no regulating system is necessary.

PROTECTION

Since the present system operates on the base of electronic memory elements, a power failure or pulse interference could affect one or more flip-flop circuits and then place the system in an unacceptable state where it would not operate properly.

In case of a power failure, the circuit shown in FIG. 8 enables all the flip-flop circuits to return to state 0 thereby dropping all regulated loads; as soon as the electrical distribution system returns to normal, the $5V_{DC}$ regulated reappears before P operates since P has a delay of about 10 milliseconds between the time it is energized and the time it operates. Ground or OV, through contact $P_2$, extends through all resets R thereby biasing the flip-flop circuits to O. As soon as P is at the operating state, $P_P$ is then at $5V_{DC}$ through contacts $P_1$, and the flip-flop circuits of the decision circuit thereby take the state commanded by inputs J, K and H (where J and K are functions of A, B, C, D). Until one or two of these inputs A, B, C, D appears, the decision circuit, as hereinabove explained, operates at the rate $H_R$. At a frequency of 60 Hz, $h_1$ causes the decision circuit to return to the state commanded by the values of A, B, C, D.

SEASONAL CORRECTION

To change the value of $P_M$ according to the seasons, the meter is modified by adding a current transformer primary with various inputs so that the number of ampere-turns is increased. This results in increasing the needle deflection and in urging the needle to energize the detectors with a reduced load.

Although the invention has been described above only in relation to one specific form of the invention, it will be evident to the person skilled in the art that it may be refined and modified in various ways. It is therefore wished to have it understood that this invention is not limited in interpretation except by the scope of the following claims.

We claim:

1. In an electrical demand meter having a graduated face and a needle pivotally mounted over said face and indicative of the power being measured, comprising in combination:
   a. a radiant energy emitting device mounted on said needle;
   b. plate means mounted over said graduated face and being adjustable with respect thereto, said plate means carrying two pairs of radiant energy detecting devices, each pair being disposed at a preselected distance from one another and the radiant energy devices of each of said pairs being disposed in side-by-side relation so that, for a given position of the radiant energy emitting device, both devices are simultaneously energized by radiation emitted from said device, and
   c. circuit means electrically connected to said radiant energy detecting devices for transmitting a signal when energized by radiation received from said radiant energy emitting device, said signal indicative of the direction and position of said needle relative to said graduated face.

2. In an electrical demand meter as defined in claim 1 wherein said needle is located between said graduated face and said plate means and wherein one pair of radiant-energy detecting devices is adjustable relative to the other pair.

3. An electrical demand meter having a graduated face and a needle pivotally mounted over said face and indicative of the power being measured, comprising
   a. a radiant energy emitting device mounted on said needle.

b. plate means mounted over said graduated face and being adjustable with respect thereto, said plate means carrying first and second pairs of radiant energy detecting devices, each pair being disposed at a preselected distance from one another, the radiant energy devices of said first and second pairs being disposed in side-by-side relation so that as said radiant energy emitting device on said needle rotates past either one of the pairs of radiant energy detecting devices three indications are generated, the first indication occurring when said energy emitting device becomes aligned with the first energy detecting device of said pair, the second indication occurring when said energy emitting device becomes partially aligned with each of said energy detecting devices of said pair and the third indication occurring when said energy radiating device becomes aligned with the second energy detecting device of said pair, and c. means electrically connected to each of said radiant energy detecting devices for transmitting the respective indications when said energy detecting devices are energized, said indications representing the directions and positions of said needle relative to said graduated face.

* * * * *